US007512788B2

(12) United States Patent
Choi et al.

(10) Patent No.: US 7,512,788 B2
(45) Date of Patent: Mar. 31, 2009

(54) METHOD AND APPARATUS FOR ANONYMOUS GROUP MESSAGING IN A DISTRIBUTED MESSAGING SYSTEM

(75) Inventors: Jong Hyuk Choi, Yorktown Heights, NY (US); Hubertus Franke, Cortlandt Manor, NY (US); Shailabh Nagar, Croton-on-Hudson, NY (US); Rajan Ravindran, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 940 days.

(21) Appl. No.: 10/316,247

(22) Filed: Dec. 10, 2002

(65) Prior Publication Data

US 2004/0111612 A1 Jun. 10, 2004

(51) Int. Cl.
*H04L 9/00* (2006.01)
*H04K 1/00* (2006.01)

(52) U.S. Cl. .......................... 713/163; 713/182; 726/27
(58) Field of Classification Search ................. 713/163, 713/182; 726/27
See application file for complete search history.

(56) References Cited

U.S. PATENT DOCUMENTS

| 6,055,551 | A  | * | 4/2000  | Heinlein et al. | 715/530 |
| 6,161,129 | A  | * | 12/2000 | Rochkind | 709/206 |
| 6,356,936 | B1 | * | 3/2002  | Donoho et al. | 709/206 |
| 2001/0046282 | A1 | * | 11/2001 | Bailey, III | 379/93.25 |
| 2003/0013951 | A1 | * | 1/2003  | Stefanescu et al. | 600/407 |

OTHER PUBLICATIONS

L-Soft International, Inc. "List Owner's Manual for LISTSERV, version 1.8d", Mar. 1999. <http://www.lsoft.com/manuals/1.8d/owner/owner.html>.*
"LISTSERV." Wikipedia, The Free Encyclopedia. Sep. 13, 2006, Wikimedia Foundation, Inc.6 <http://en.wikipedia.org/w/index.php?title=LISTSERV&oldid=75535683>, p. 1.*
"Electronioc mailing list." Wikipedia, The Free Encyclopedia. Oct. 21, 2006, Wikimedia Foundation, Inc. <http://en.wikipedia.org/w/index.php?title=Electronic_mailing_list&oldid=82756497>, pp. 1-3.*
"L-Soft." Wikipedia,The Free Encyclopedia. Jul. 13, 2006, Wikimedia Foundation, Inc. <http://en.wikipedia.org/w/index.php?title=L-Soft&oldid=63622933>, p. 1.*

* cited by examiner

*Primary Examiner*—Christopher J Brown
(74) *Attorney, Agent, or Firm*—Douglas W. Cameron; Anne Vachon Doughert

(57) ABSTRACT

A group messaging system enabling anonymous collective communications in a group which is locally defined in association with a group owner's messaging account, wherein messaging software at the group owner converts a group message into multiple one-to-one group messages destined to each group member in collaboration with the said group membership resolution process. The invention further includes a group message reply process wherein the messaging software at a recipient's side composes a reply message and transmits it to the group owner messaging software which then forwards it to the group members in collaboration with said group membership resolution process, thereby providing a means of designating the identity of a group in the group owner messaging account, sending a group message, and hiding the identities of individual recipients during the lifetime of the group message. The group owner side can additionally perform access control for group communications.

9 Claims, 6 Drawing Sheets

METHOD AND APPARATUS FOR ANONYMOUS GROUP MESSAGING IN A DISTRIBUTED MESSAGING SYSTEM

FIELD OF THE INVENTION

This invention relates to group messaging in distributed messaging systems and in particular to anonymous group messaging therein.

BACKGROUND OF THE INVENTION

Modern messaging systems and collaborative environments, such as Lotus Notes, are dispatched across large enterprise systems as a distributed application. Messaging accounts or IDs are typically assigned to one particular server. Traditionally, to communicate with a set of receiving clients, the sender of a message would need to delineate all client IDs in the message header. A typical message header would include the following address fields.

From: sid
    To: rid-1, rid-2, . . . , rid-n
    Cc: rid-n+1, . . . rid-n+m
    Bcc: rid-n+m+1, . . . rid-n+m+k The prior art messaging format is not only cumbersome, but it also exposes the IDs of each recipient to all other recipients, with the exception of the "blind carbon copy" field (the <Bcc:> field). A recipient replying to the sender and to all receivers would send a message to the <From:>, <To:>, and the <Cc:>, but will not be able to see and reply to <Bcc:>. While the <Bcc:>feature ensures that the sender can inform recipients of matters without exposing their identity, relevant feedback may not be provided to all appropriate parties.

One way to eliminate the problems associated with the above-described approach is to utilize a group concept. The group concept can be implemented in one of the following three ways:

(a) the sender maintains a group name that is associated with a list of recipients, whereby the messaging client software replaces the group name issued in the <To:>, <Cc:>, or <Bcc:> sections with the list of recipient IDs;

(b) the sender and recipients utilize a global messaging resource such as a mailing list, which is a special mail ID which reflects all messages sent to it to the members that have subscribed to the mailing list; or (c) the messaging client does not replace the group name in the recipient list; however, the sending software, identifies the recipients and sends them the message, with the group name still showing up in the recipient field.

There are disadvantages to all three of the group messaging approaches. In (a), the IDs of recipients must be exposed to all recipients to enable the recipient to reply. If a <Bcc:> section is utilized those IDs are not sent to the recipients, hence they cannot receive any reply. In (b), the anonymity of the recipients is maintained during a sequence of message transmissions where the initial message and all replies to it are sent to the mailing list which then reflects them to all subscribers. The group members need to be added to the mailing list by themselves or by a central administrator with appropriate privileges. With the mailing list, however, it is difficult to create the messaging group that is defined with the semantic context, the management domain, and the naming scope of the individual messaging user account in a highly dynamic way. As a result, it is too cumbersome to use the mailing list as the per-account messaging group mechanism. In (c), the anonymity of the recipients is maintained as well; however, the recipients are unable to respond to the group since the group is defined only in the sender's context and does not bear meaning in the recipients' contexts.

To summarize, in (a) and (c) above, the group has the naming scope only in the local context of the original sender, and as a result, either the identity of the group members is not kept anonymous, as in (a), or successive reply message exchanges within group members are not possible, as in (c). On the other hand, in (b), an anonymous group messaging method is provided, but only with the introduction of the special group IDs having non-local, or global, naming scope as the per-account messaging group mechanism. The use of the global mailing list for per-account messaging account makes the naming and the membership definition difficult. In an enterprise messaging environment, for example, a local messaging group "managed by" can be defined per messaging user account representing the messaging users who are managed by the user account. Such grouping mechanism is based on the relationship between the group owner and the group members. Moreover, the group membership determined by the relationship is highly dynamic in nature—the group members are dynamically determined according to the attributes of the group members. The prior art mailing list does not support the notion of the group owner nor the relationship of the group members to the group owner. In order to emulate per-account message groups by using the mailing list, it would be required to have a prohibitively large number of mailing list accounts and to make virtual associations between the messaging accounts and the mailing lists. This method would incur resource usage overheads and administrative burdens.

Although there exist prior art approaches that provide secrecy of message contents or anonymity of group members on the sender side, none of them provides the capability of anonymous group messaging whereby anonymity of group members is kept throughout the entire lifetime of group message exchange; none provides seamless continuation of message exchanges which is maintained through simple replies to the original group message; and, none provides access control that defines the capability of sending, replying to, and receiving group messages according to role models of the participant. The foregoing, therefore, are objectives of the present invention.

U.S. Pat. No. 6,266,420, of Langford, et al, entitled "Method and Apparatus for Secure Group Communication" provides the notion of the group public key and the group private key. In the patented method, the sender encrypts the symmetric key once per group using the group public key. A recipient uses the group private key to extract the symmetric key from the wrapped symmetric key encrypted by the sender. As a result, the approach eliminates the computing overhead and storage/transmission overhead of previous approaches which perform encryption, transmission, and decryption of the symmetric key multiple times, one per each receiver. However, this prior invention only focuses on the secrecy of the message contents in group communications. On the other hand, it is desirable to focus on the anonymity of the recipients, too. It is not practical to enforce anonymity by using the symmetric and asymmetric keys, as in the prior art, since all the message routers or exchangers en route from the sender to the recipients decipher the recipient information to further route the message.

In another prior art approach, detailed in U.S. Pat. No. 6,256,733, of Thakker, et al, entitled "Access and Storage of Secure Group Communication Cryptographic Keys", group credentials required in secure group communication systems are dynamically administrated for enhanced manageability. Each group member can generate security credentials, can store them in a repository that can be accessed by multiple parties, and can retrieve a portion of them. Means of membership management are also provided to cope with the case of member addition and deletion. The patented method also focuses on the secrecy of the message contents and not on the anonymity of the recipients.

Japanese Patent Publication JP2001-339381, entitled "Anonymous Recipient Information Delivery System and Delivery Method", tries to keep both the secrecy of message contents and the anonymity of the correspondents at the server side. To maintain secrecy, the server transmits the encrypted message using the public keys of the clients. Since the public key itself can become a means to extract identity information of clients, a gateway is provided to relay messages between the server and client, whereby the server does not manage the public keys of clients but the gateway manages the public keys. The gateway randomizes the public keys when it communicates with the server, so that the identities of clients are kept concealed. The gateway then relays the message from the server to the clients. The gateway should transform the message encryption from one using the randomized public key to one using the original public key of the individual client. This prior art intends to provide anonymity, yet, it provides anonymity from third parties and not among recipients. Moreover, the requirement for a special gateway for transformation is burdensome and introduces a high computational overhead. Finally, the prior art approach does not provide a means for a client to reply to a group message without knowing the recipient's individual identity.

Japanese Patent publication JP201-186169, entitled "Electronic Mail Management System and Recording Medium for Storing Electronic Mail Management Program", provides a way of dynamically creating sub-mailing list within a mailing list according to the membership information of subscribers in order to deliver electronic mails of local interest only to the group of subscribers in the sub-mailing list. When a client subscribes to a mailing list, a client may not want to receive all of the messages on the mailing list, since there may be multiple independent topics being discussed in the mailing list and the client may be indifferent to some of those topics. The cited Japanese patent publication facilitates the creation of sub-mailing lists within a mailing list and the creation of sub-mailing lists out of the predefined sub-mailing lists in the whole list. While this prior art provides a way to limit the delivery of messages to a subset of the original group, it does not provide a means of enforcing anonymity of recipients of the message. Although it can be said that limiting message delivery only to the sub-mailing list is a form of a secrecy provision, it does not provide content secrecy or recipient anonymity among recipients and on the wire.

Japanese Patent publication JP2001-160007, entitled "Electronic Mail Device" suggests a group mailing system that can automatically fill in the recipient addresses from a predefined group of addresses if the corresponding recipient names appear in the message body in order to improve operability and to eliminate possible input errors. Because this prior art approach does not address anonymity issues in the group communication environment, it does not provide the needed solution which is an object of the present invention.

Hence, what is needed, and is an objective of the present invention, is a method of collaboration and message exchange that is flexible and is based on per-account group definition without the need for a centralized, global messaging account resource.

A further objective of the present invention is to provide a method and system which maintains the anonymity of the recipients from other recipients and enables a recipient to reply to the sender and the group members, without knowing their identity by utilizing the group name provided in the original message.

Another objective of the present invention is to provide a method and system for anonymous group messaging whereby anonymity of group members is kept throughout the entire lifetime of group message exchange, providing seamless continuation of message exchanges through simple replies to the original group message.

It is also an objective of the present invention to provide the foregoing with access control that defines the capability of sending, replying to, and receiving group messages according to role models of the participant.

SUMMARY OF THE INVENTION

The foregoing and other objectives are realized by the present invention which provides an apparatus, methods, and media-containing programs for facilitating anonymous group messaging. The present invention provides an anonymous group messaging system which enables a thread of successive anonymous group message exchanges within a group locally defined by a group owner without the need for the global name resource, such as the electronic mailing listaccount. The invention further comprises a group message delivery method which uses the inventive group messaging system and storage media containing the program for implementing embodiments of the inventive group message delivery methods.

In order to achieve the above objectives, one embodiment of the system of the present invention provides a group message exchange agent apparatus which receives a group message, destined to a group defined by the group owner whose messaging account resides in or is associated with the apparatus, and forwards the message to the group members. The group message exchange agent apparatus converts the received group message into multiple one-to-one messages through a retrieval of membership information from address storage of the group owner. An anonymous group messaging user agent apparatus is further provided to offer a group message reception and transmission capabilities of interpreting the group message information, such as identities of the group and of the group owner, in the group message header; providing notification of reception of a group message to users; providing a user interface by which users can designate a group message initial transmission or reply transmission; and providing a group message transmission capability which attaches the group message information, such as identities of the group and of the group owner, to the group message header.

One embodiment of the present invention provides an anonymous group message exchange method which consists of the following activities of the group message exchange agent apparatus: receiving a single group message which is destined to a group ID, verifying the message sender's access control rights to the group messaging function to allow or deny message transmission, and delivering a single message to each group member by the steps of replicating the message header and body, retrieving the ID of each member of the group from the address storage at the group owner, verifying addressee group member's access control rights to the group messaging function in relation to the message sender and also verifying other semantic information to allow or deny message delivery, changing the message header by replacing the group ID with an individual group member's ID in one or a plurality of recipient fields for verified addressees, tagging the message with the group and group owner identities, and transmitting each such one-to-one message to each verified addressee group member.

Another embodiment of the present invention provides an anonymous group message exchange method which consists of the following activities of the group messaging user agent apparatus: attaching the group message information to the message header and transmitting the group message to the group messaging agent of the group owner, either directly or through the message transfer agent and the message delivery agent for message routing.

Another embodiment of the present invention provides a communication method for group discovery, which consists of the following activities of the group messaging user agent and group message exchange agent apparatus: sending a group search request from a user agent of a sender to the address storage through a group message exchange agent of the group owner; searching for groups that meet the specified search specification; and, sending replies from the address storage to the user agent through the group message exchange agent.

Another embodiment of the present invention provides a group messaging proxy apparatus which performs a group membership resolution method comprised of the following steps: determining the group identity from a forwarded group message header; sending a group membership resolution request from the proxy to the address storage location through a group messaging agent of the group owner; searching for member IDs in the group that meet the specified search specification; verifying access control rights of the proxy and the message sender to the group; and, sending matching member IDs to the proxy through the group messaging agent of the group owner, and converting the group message into multiple one-to-one messages to the members of the group.

The following text provides a detailed description of the anonymous group exchange and user agent apparatus, the method of message delivery using them, and the storage media containing the program embodying the method of message delivery, by presenting preferred embodiments with detailed illustrations and figures to facilitate easy understanding of the present invention.

The description of the preferred embodiments of the present invention is based on a class of messaging systems for the Internet mail standard. Certainly, the technical idea provided in the present invention can also be applied to other types of messaging systems such as X.400, SMS (Short Messaging Service), and instant messaging services. The main technical idea behind the preferred embodiments presented in the present invention disclosure is not restricted nor limited to the enumerated messaging systems.

In addition, preferred embodiments of the present invention include computer systems that are programmed to perform the methods provided in the present invention as well as such computer programs. In the preferred embodiments implemented with computer programs, the sequence of instructions of the computer program that implement the anonymous group message exchange methods resides in one or more local memory locations (RAM, ROM) or can be stored as a computer program product or image inside a secondary computer memory, such as disk drives or other types of media, until the computer program requires it to execute to implement the inventive anonymous group message exchange method.

BRIEF DESCRIPTION OF THE DRAWINGS

The invention will now be described in greater detail with specific reference to the appended drawings wherein.

DETAILED DESCRIPTION OF A PREFERRED EMBODIMENT

Figure 1:
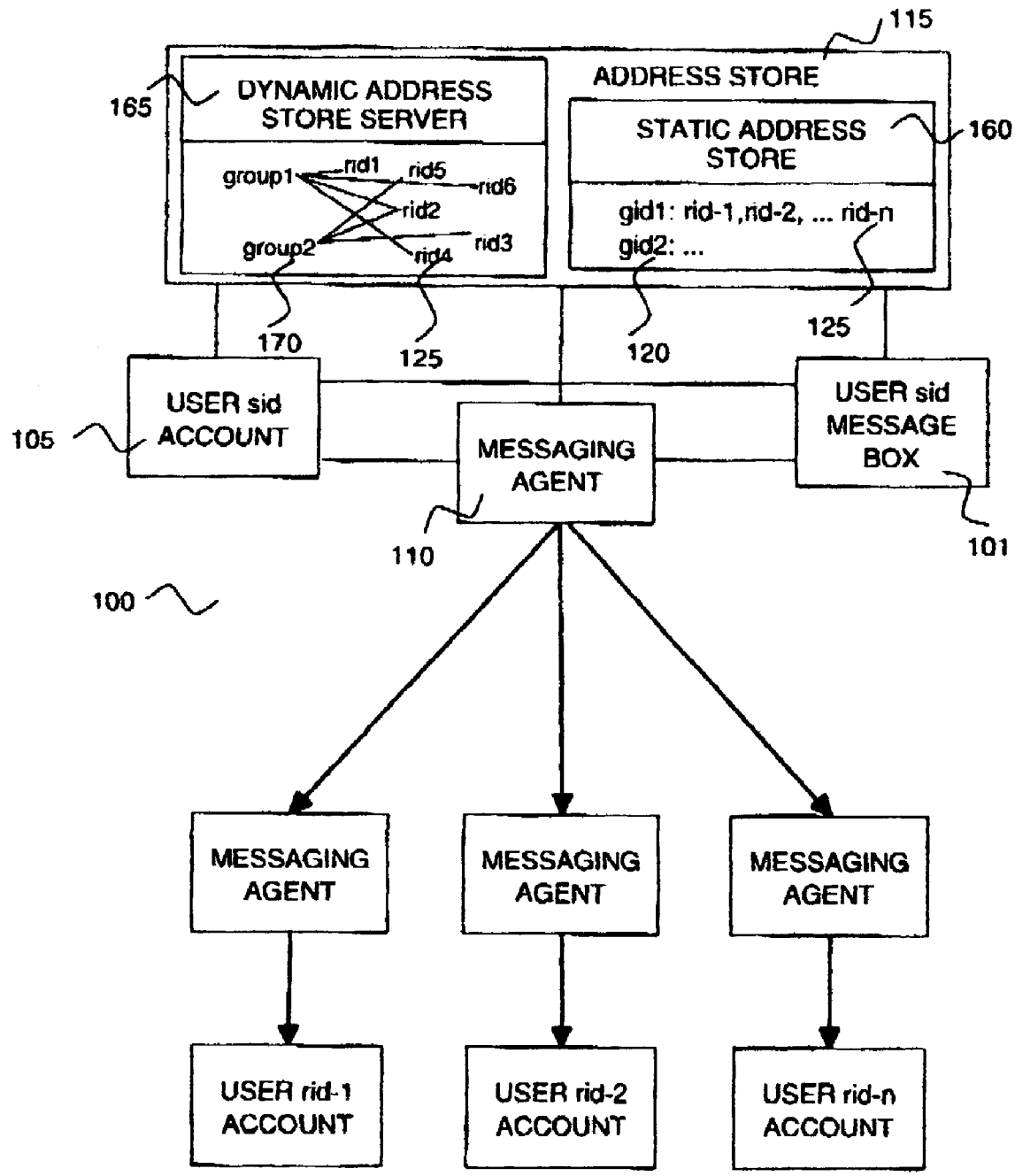
FIG. 1 is a block diagram illustrating a system for providing anonymous group messaging in accordance with one embodiment of the present invention.

The present invention provides a method and apparatus that enable members of a predefined group to receive a message destined to the group ID and to exchange messages with group members, without disclosing identities of the group members. The invention further provides continued reply exchanges as a message thread wherein the anonymity of the group members continued to be kept anonymous.

Prior art methods would resolve member identities at the sending party to send individual messages, with each group member as the destination of each individual message. Other methods utilize a global group identity in the message headers for anonymous group messaging. In contrast, the method provided by the present invention preserves in the message header the group name or identity which has the naming scope, the semantic context, and the management domain local to the group owner. Unlike the prior art mailing list methods, the inventive methods maintain the relationship of the group to the group owner account. The group name in the message header of the group message hides the identity of all group members for the lifetime of the group message, (i.e., during composition, transmission, and storage), without the need for a global group ID that would otherwise require extra resources in global name space and management burdens.

The group ID (gid) has its naming scope and management domain in the context of the group owner. A group owner can maintain the list of the group in local storage such as in a local address book associated to the owner's messaging account. A sender can contact a group owner to retrieve a list of group descriptions or can presume predefined common group names without prior contact. It is a general case that a group owner initiates a group message thread to group members, where a group owner becomes the original sender. However, other group members or third parties can, under the present invention, also be allowed to initiate a message to the group if they have appropriate access rights. After a group discovery process, which will be described hereinafter, a sender can select one or a plurality of such groups as message destinations.

Messaging agents are located at each member location, as further detailed below with reference to FIG. 2. The messaging agent at the sender side transmits a group message to a message agent, more specifically to a group messaging agent of the group owner. The group messaging agent forwards the group message to a plurality of group members by sending a single one-to-one message per group member location. The ID of each member is retrieved by the group messaging agent and is used as the destination with which intermediate message transfer agents route the message. However, the group name or identity information is also included in the message so that the messaging agent at the receiving end can recognize the group and inform the recipient that the delivered message was destined to the group. This group information together with the ID of the group owner, only in whose context the group has meaning, will continue to be included in the subsequent messages of the same thread generated in reply to the original message.

Although a recipient user messaging agent can recognize and inform the recipient of a reception of a group message reception, it is not possible for a recipient user messaging agent to directly reply to the group or to the group members, because the group is defined only in the group owner's messaging account. Accordingly, any reply message goes only to the group messaging agent at the group owner's side where group membership information resides. The group owner's group messaging agent would then forward any incoming replies to a plurality of group members, again by retrieving group membership information from the local address storage of the group owner. Because the group name or identity, together with the group owner's ID is retained in the message header throughout subsequent message exchanges as the group message routing information, replies are always directed to the group owner's messaging agent and then forwarded to group members.

Referring to FIG. 1, one embodiment of the anonymous group messaging system of the present invention is shown. As depicted therein, a user has an account 105 which is associated with a user message box 101, that stores incoming and outgoing messages, and user address storage 115. There are two types of user address storage including static address store 160 and dynamic address store server 165. The status address store contains group identities 120, such as gid1 as shown in FIG. 1, along with the identities of the group members 125, such as rid-1, rid-2 . . . rid-n as shown. The group identity entry defines a group whose membership is determined statically. On the other hand, the dynamic address store server determines the members of the group 170 dynamically out of a set of messaging addresses 125 according to their attributes and relationship to the group owner and to one another. An example of such dynamic address store server is an enterprise white pate directory server that contains entries of employees and customers. "Managed by" and "customer of" are examples of such dynamic groups which are defined in the context of a group owner. The dynamic group "managed by" of a group owner can be obtained by sending a directory search request for entries having the group owner as their "managed by" attribute. In response to the directory search request, the matched entries are returned in the search result as the members of the dynamic group "managed by". The dynamic address store server enables dynamic creation of the messaging groups according to the relationships of group members and the group owner. In the rest of the description of the invention, the address store 115 is meant to represent both the static address store 160 and the dynamic address store server 165. It will be clear to one having skill in the art that either or both can be implemented with the attendant functionality.

Figure 2:
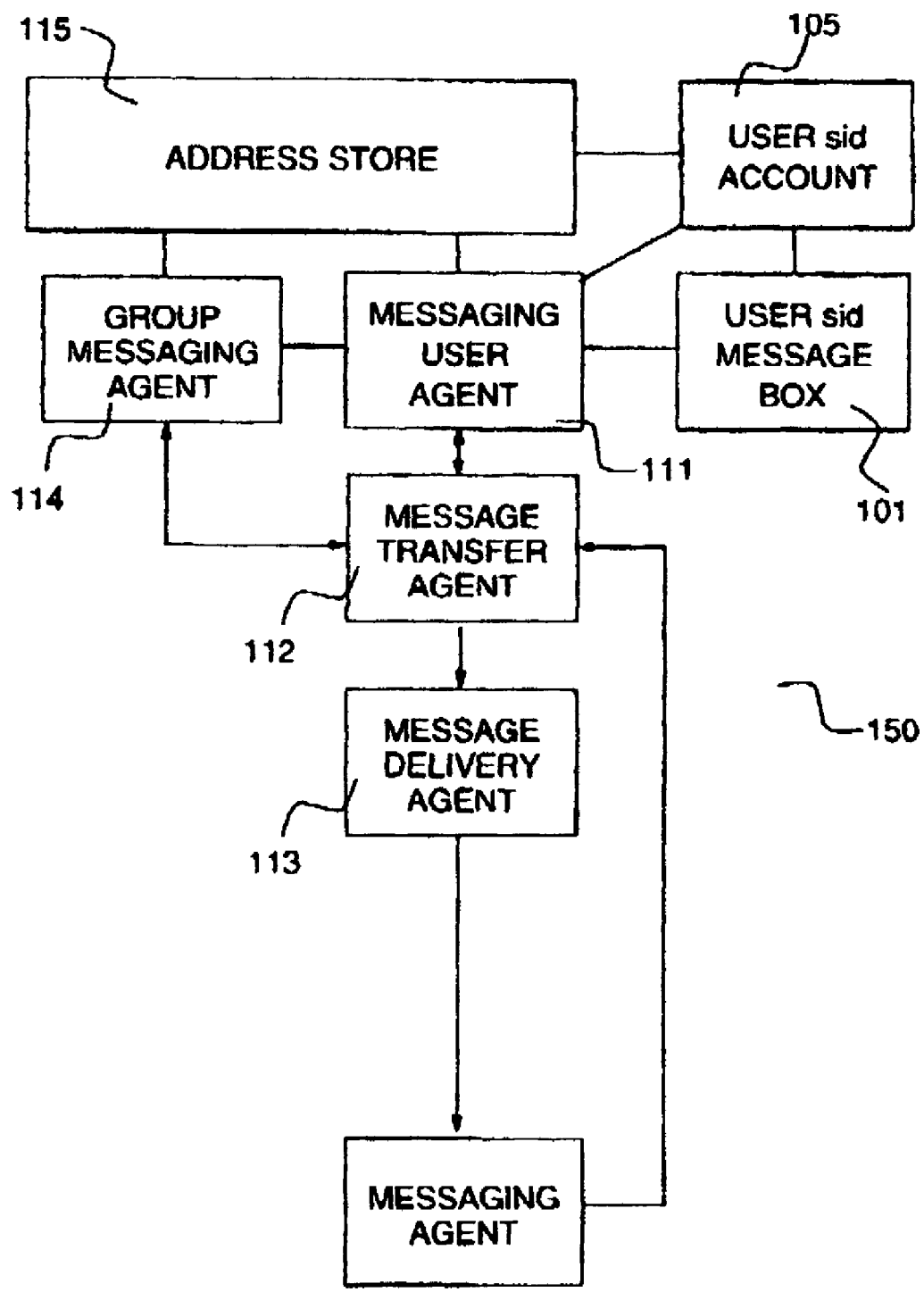
FIG. 2 is a block diagram illustrating an apparatus for sending, receiving, and relaying group messages anonymously in accordance with one embodiment of the present invention.

Referring to FIG. 2, an anonymous group messaging system is further detailed wherein a messaging agent at a user location, 110 as shown in FIG. 1, comprises a messaging user agent (MUA) 111, a message transfer agent (MTA) 112, a message delivery agent (MDA) 113, and a group messaging agent (GMA) 114.

The ensuing description of an embodiment illustrated in FIG. 2 assumes a special case where the sender is the group owner. When a sender composes a message, the identities of message recipients can be selected from the address store 115 that contains information on groups and recipients. If the MUA selects a group ID as the recipient list of a message, the GMA will convert the message to a plurality of individual non-group messages each of which is destined to one group member. The GMA will replace the group name in the recipient list of each message with each group member's identity. The group name, together with the identity of the group owner, is instead attached to the message header either as a tag to a header field or as a separate header field. In the case of an Internet electronic messaging system, the tagging can be achieved either by using the name and comments fields of the message address formats defined in RFC 822, by using the recipient fields in the message header without generating any MTA recipient addition commands, or by using an additional user defined field whose name is prefixed by "X-".

The GMA sends the multiple individual messages destined to group members to local or remote MTAs whose primary task is the routing of messages. The routing decisions made by the MTA may be different for different individual messages generated out of a single group message. In the domain name service (DNS) for instance, the address of the next MTA for a given recipient address is determined by the message exchanger (MX) entry of the domain name record. If a recipient is in the domain covered by the same MTA as the sender's domain, the message will be delivered to the recipient's message box via a local MDA. Otherwise, the message will be delivered to the next MTA along the routing path to the recipient's message box.

In one embodiment of the present invention, when an MUA displays a received message, it can display a group name as the recipient, either in place of or together with the recipient's identity, so as to inform the recipient of a group message reception. A group name can be extracted from the message header of the received group message.

A means for responding to a group is provided in conjunction with or independently of the conventional means of responding to the message sender or to other explicitly designated recipients. In one embodiment, this is achieved by attaching a group ID and group owner ID to the group reply message header. The reply is routed back to the group owner's location and distributed to the group members by the group owner's messaging agent. The method and process for replying to a group message of the present invention does not need the group membership to be resolved elsewhere except at the group owner's messaging agent.

A group has the scope of its group owner throughout its lifetime. In one embodiment of the present invention, a responding messaging agent sends the group reply message to the group owner's messaging agent with the group ID and the group owner ID information. The group membership can be resolved in the group owner's account where the group information is stored in the associated address storage. Because the group has per-account scope, group names can represent the relationships of the group members to the group owner and can be used to dynamically define groups in this respect. It is also easy to manage groups of the messaging user account, because the groups are stored in the per-user address storage.

The messaging agent at the group owner side delivers replies from a plurality of such recipients to group members. In one embodiment of the present invention, the MTA at the group owner forwards a group reply message to the GMA therein as well as delivering it to the group owner's message box, both through the local MDA. The MTA makes a routing and forwarding decision as such when it senses that the message is a group reply message in a group message thread GMA will deliver the group reply message as a plurality of individual messages to the group members, one per each, through the same process as in the initial delivery of the group message, (i.e. through lookup of group names in the group owner's address storage). Subsequent replies will be processed in the same way as the first reply message.

Hence, the present invention enables the group messaging system to maintain both the anonymity of the group members from each other and from third parties and the capability of continued message exchanges in a thread through a simple reply mechanism with the per-account scope of groups and without the need for a global group identity. This is made possible by redirecting a group message to the group owner's messaging agent at which multiple individual messages are generated and transmitted to the members of the group. Consequently, a group owner is able to create, manage, and delete arbitrary groups and group membership without being restricted by global administrative policies and without consuming global naming resources such as global group addresses, (e.g. mailing list addresses).

In the present invention, the group name or identity along with group owner's identity can be attached in a message in various ways. In one embodiment of the present invention, a group identity and the group owner identity are stored or tagged in the message header. Such information can be tagged into one of a plurality of message header fields or can be stored as a separate field in the message header.

Figure 3A:
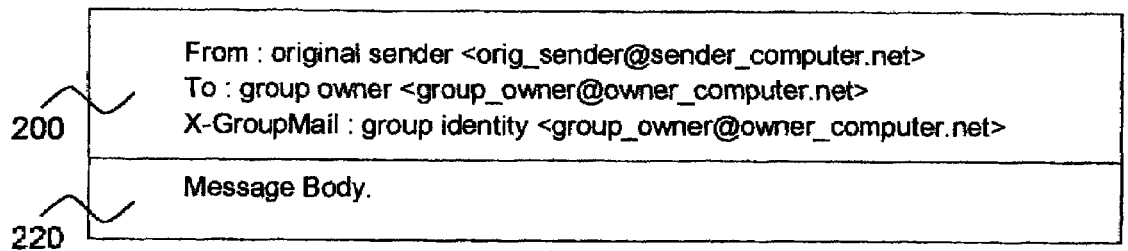
FIG. 3 is a block diagram illustrating a message header where the group information is stored in separate header fields in accordance with one embodiment of the present invention.

Referring to FIGS. 3A-3D, in one embodiment of the present invention, a group identity or name is stored as a separate message header field along with the group owner's identity. FIG. 3A shows an example of an Internet mail message from a sender to a group, where the corresponding group information is stored in a user defined field within a message header. The message must be delivered to the group owner in order to be forwarded to individual members of the group. The GMA of the group owner converts the single group message to multiple one-to-one messages retrieving each group member's address of the group specified by the group ID in the <X-GroupMail> field. A user defined field name in the Internet mail (specifically, for example, RFC 822) starts with "X-" and the field is entitled "X-GroupMail" for description purposes. In FIG. 3A, the <To:> field in the message header contains the ID of the group owner and the <X-Group-Mail:> field contains the group identity, together with the group owner ID. The <To:> field is for the routing of messages while the <X-GroupMail:> field is for the designation of the group.

Figure 3B:
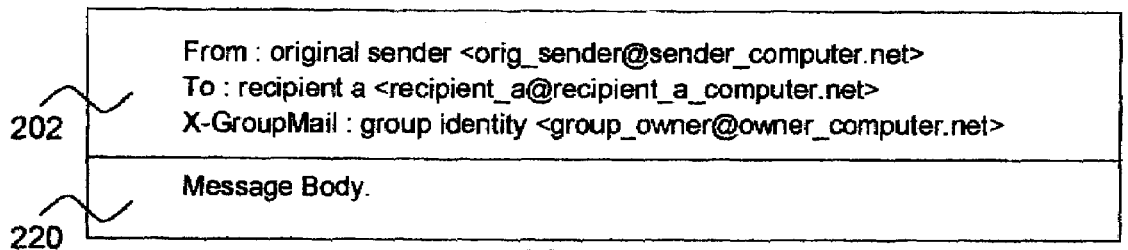

FIG. 3B shows the message 3A as it has been converted by the GMA for forwarding to one of the group members, the recipient "a". The <To:> field is changed to the ID of the recipient "a" for message routing while other fields remain the same. The <X-GroupMail:> field is unchanged so that the information is maintained for group members to reply to the group owner, since there is no group membership information at any group member locations other than the group owner. The <From:> field should also be preserved to identify the original sender.

Figure 3C:
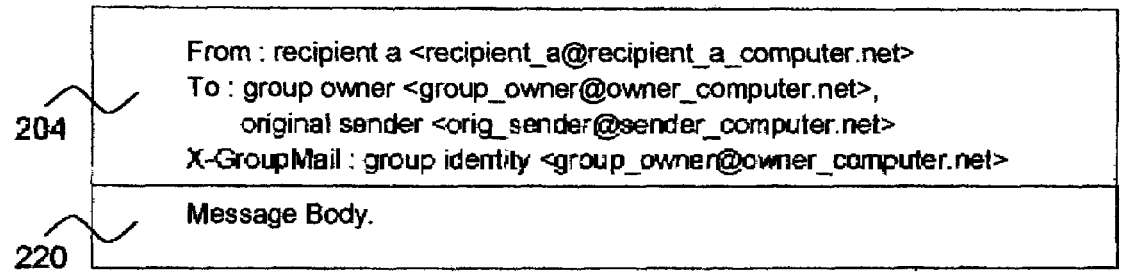

FIG. 3C illustrates an example Internet mail message from the recipient "a" to the group as a reply to the message of 3B. The destinations of the group reply message include both the original sender and the group owner. The group owner will then forward the reply message to other group members by retrieving group member IDs from its address storage using the group ID from the <X-GroupMail:> field. The <X-Group-Mail:> field should again be maintained in order to enable subsequent replies from group members. The reply message will be delivered to the original sender directly via a path independent of the group messaging agent of the group owner. The <X-GroupMail:> field and the group owner ID in the <To:> field can be maintained in this message header as well, in order to allow subsequent group message replies from the original sender.

Figure 3D:
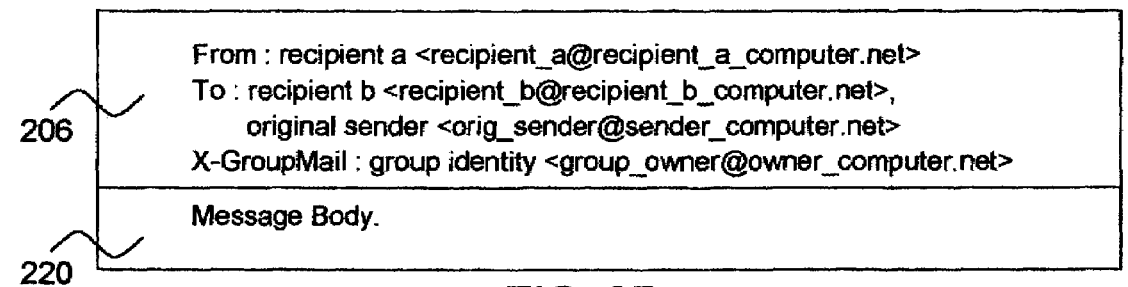

FIG. 3D shows the example Internet reply message of 3C from the recipient "a" which is then forwarded to the recipient "b" by the GMA of the group owner. Upon receiving the reply message from the recipient "a", the GMA of the group owner generates multiple individual one-to-one messages to the members of the group. The recipient "b" is one of such group members. The <From:> field contains the ID of the recipient "a" (the member who have sent the reply message). The <X-GroupMail:> field is preserved again. The <To:> field contains the ID of each member, recipient "b" in this instance. In addition, the <To:> field contains the ID of the original sender but the GMA of the group owner does not send this message to the original sender. The original sender will be receiving the reply message directly from the replying group member, the recipient "a" in this example. In the Internet mail system (RFC 821), it is possible to designate an address in a recipient list of the message header without actually sending the message to the address. The actual destinations of message transfers are specified during the MTA-to-MTA protocol message exchanges.

Alternatively, it is also possible to attach a group ID and group owner ID as a tag to one of the existing message header fields, e.g. <To:> or <Cc:>. In the Internet mail standard (RFC 822) for instance, tags can be placed within a comment in a field enclosed by parentheses.

Alternatively, it is also possible to attach a group ID as an additional recipient name and group owner ID as an additional recipient address in one of the existing message recipient fields of a message header (e.g. <To:> or <Cc:>), without directing the MTA to send the message to the group owner ID when the message is destined to one of the group members but not to the group owner. The GMA of the group owner will not send the recipient addition command for the group owner ID as an MTA-to-MTA protocol exchange while maintaining it in the recipient field of the message header.

Figure 4:
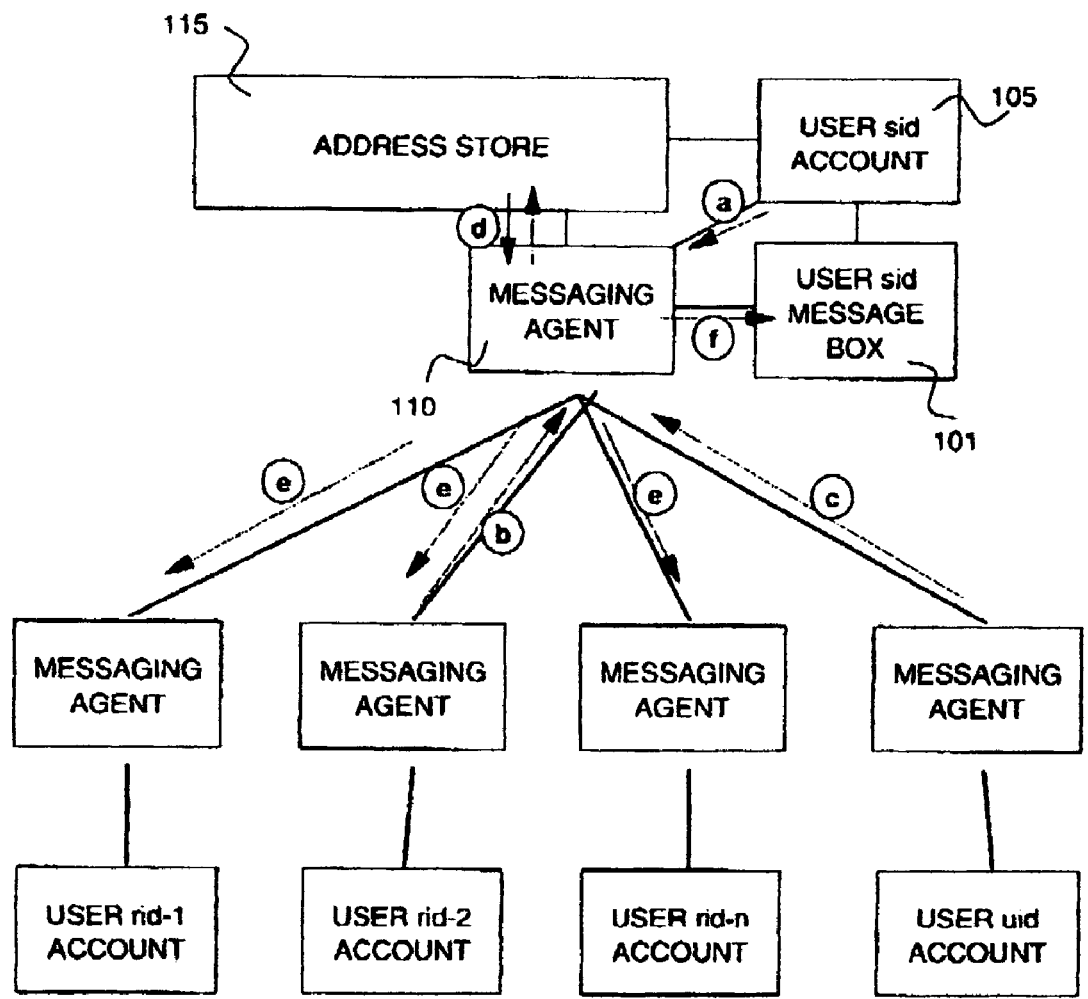
FIG. 4 is a flow diagram illustrating a representative information flow process of sending, receiving, and relaying group messages anonymously in accordance with one embodiment of the invention.

Referring to FIG. 4, an information flow for the group message delivery, in accordance with one embodiment of the present invention, is illustrated. Messages can be delivered to a group from any messaging accounts including, the group owner, one of the group members, and a third party. The group owner can set access control rights for different messaging accounts by designating access control rules. Examples of such access control rules include: "all messaging accounts in the same domain as the group owner can initiate group messages to group A of the group owner", "members of group B cannot initiate a new group message thread to group B, but can reply to messages in the existing message threads to group B", and so on. Access control rights for a group can be stored along with the group entry in the address storage as an access control list. The flow "a" represents a group message send request from the group owner itself Also referring to FIG. 2, the MUA 111 of the group owner can either directly contact the address storage 115 to retrieve group member IDs to send messages (d) or can direct the GMA 114 to perform group membership resolution and transmission on its behalf (d). The flow "b" represents a group message send request from a member of the group who is not the group owner. Also referring to FIG. 2, the MTA 112 directs the request to GMA 114 to generate a plurality of one-to-one messages out of a single group message. The GMA optionally checks access control rights of the sending member. The flow "c" represents a group message send request from a third party sender. The information flow is essentially the same as that for a message initiated by a group member; however, it is preferable to implement more restrictions on access control (e.g., higher level security checks or authentication). The messaging agent of the group owner forwards the group message to each group member as individual one-to-one messages (e,f). If the group owner itself is a member of the group, the message will be delivered directly to the message box of the group owner (f), as well.

In order to verify the identity of the initial senders of the group message, or of the senders of replies to the group message in association with the access control right, a means of authentication is provided in one embodiment of the present invention. In that embodiment, the messaging agent of the group owner can store public keys for a plurality of group members either in address storage 115 or in a separate key storage. The group owner may also export its public key to a plurality of group members. To implement authentication, the group owner challenges a group member by sending an instant value of a symmetric key variable encrypted by its private key. The group member can extract the value by decrypting it with the group owner's public key, and then send the group owner the received symmetric key encrypted by its private key. The group owner authenticates the group member by comparing the original value of the symmetric key and the received value after decrypting it with the group member's public key.

Figure 5:
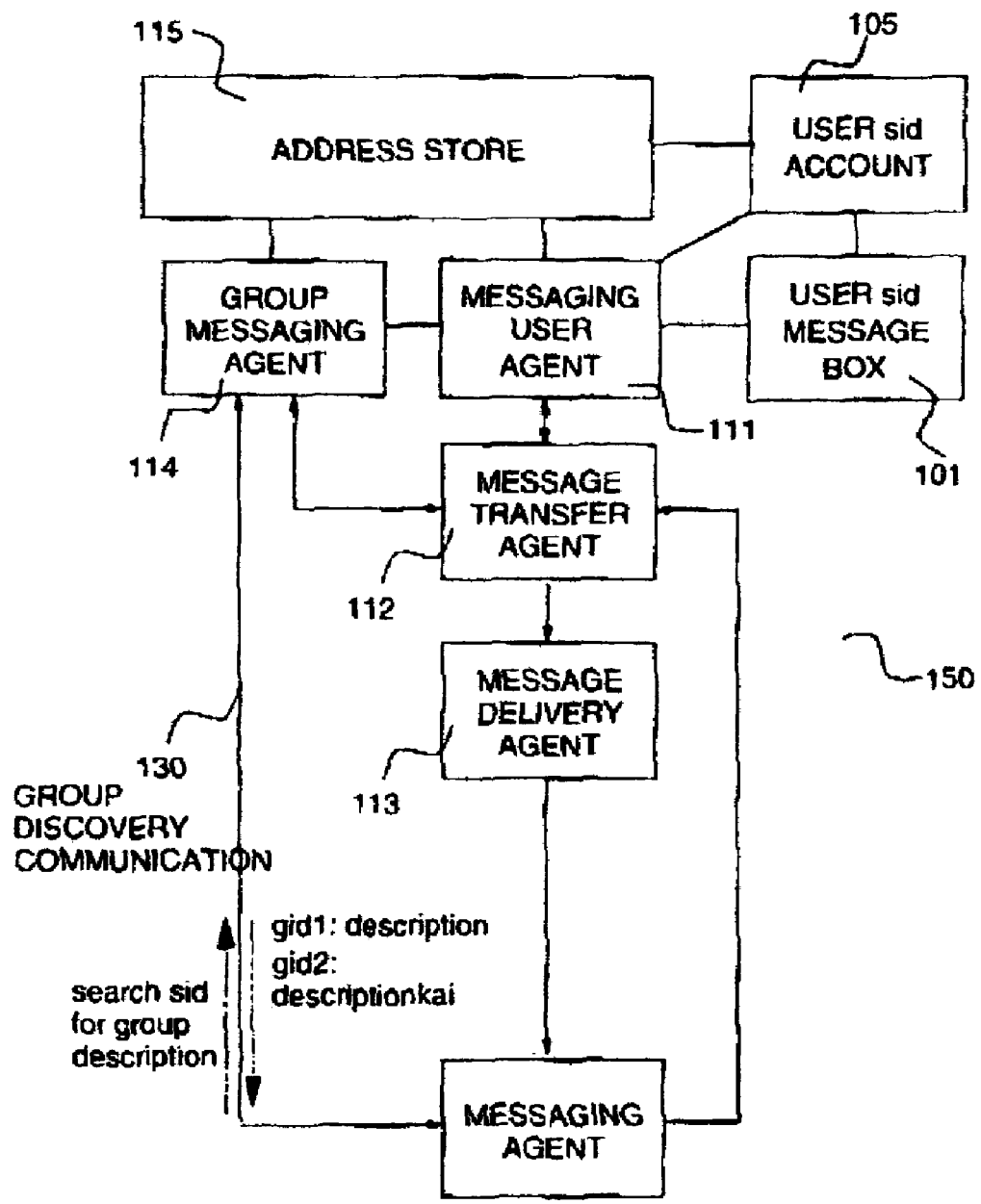
FIG. 5 is a block diagram illustrating a system for providing group discovery between a group messaging agent and a user messaging agent in accordance with one embodiment of the present invention.

Referring to FIG. 5, a means of group discovery is illustrated in accordance with one embodiment of the present invention. In order for a sender to initiate a group message, the sender needs to retrieve a list of groups and their descriptions exported by the group owner. Examples of such list are "reports to: a group of people that report to the group owner", "project A: a group of people that work on project A", and so on. The group discovery can be implemented by using information retrieval protocols such as LDAP (Lightweight Directory Access Protocol; RFC 2251). The sender can search for a list of groups that match a search specification. Access control can also be applied either on a group-by-group basis or on an attribute-by-attribute basis. Once a sender has located a group matched to the search specification and has been authenticated, the sender may store the group ID along with the group owner's ID at the sender's messaging agent for easy access for future communications to the group.

Figure 6:
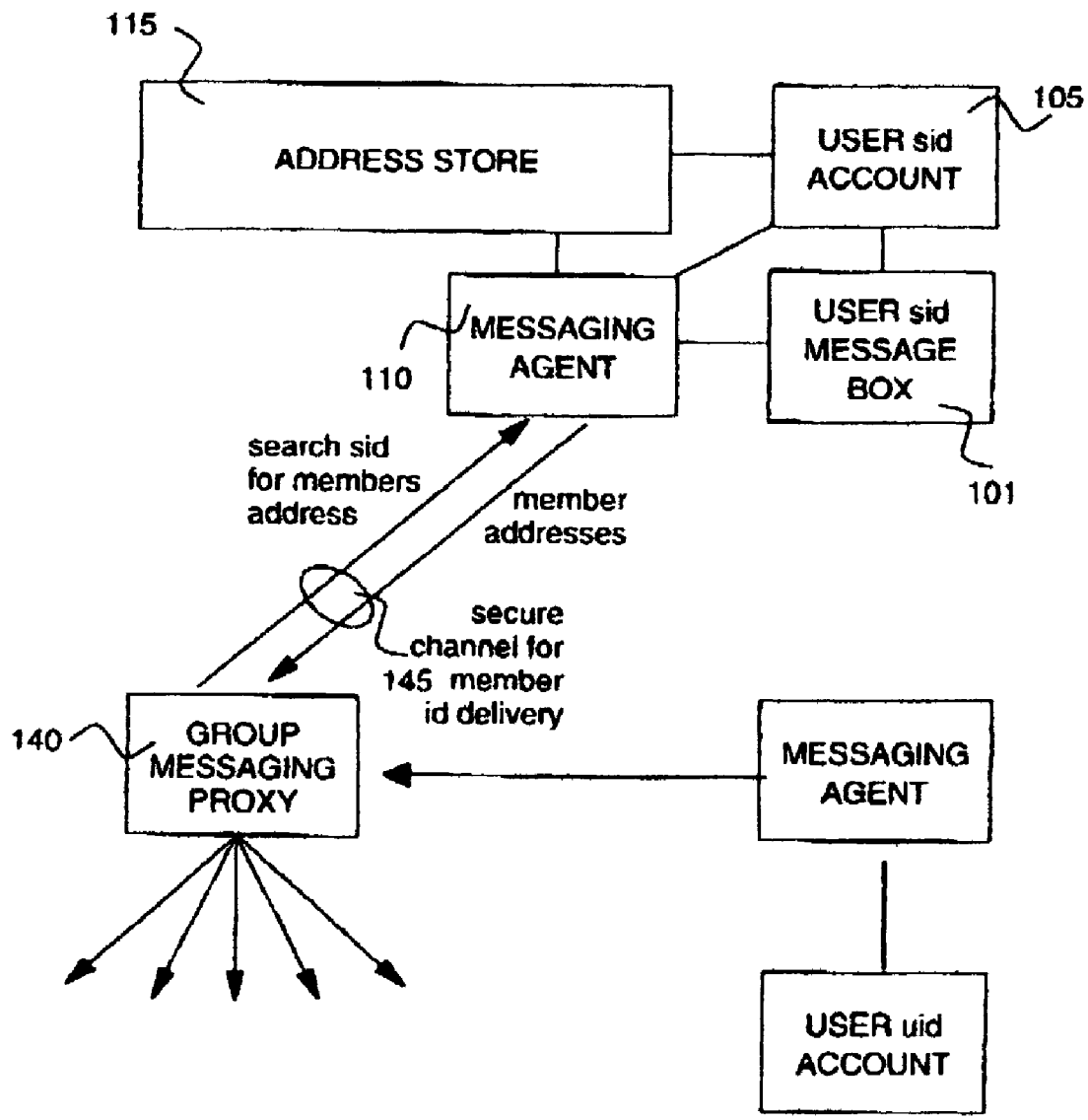
FIG. 6 is a block diagram illustrating a system for providing the group membership resolution between a group owner's messaging agent and a group messaging proxy in accordance with one embodiment of the present invention.

Referring to FIG. 6, a group messaging proxy 140 that can forward group messages on behalf of group owners' messaging agents is illustrated for one embodiment of the present invention. The group messaging proxy can contact the messaging agents of the group owners to perform group membership resolution, (i.e., to retrieve IDs of members of a group from the group owner in order to forward received group messages to the members of the group). The group messaging proxy is assumed to be a trusted party and the communication channel 145 between the proxy and the messaging agent of the group owner is required to be secured by using private networks or by using a ciphering means. Communication between the group messaging proxy and the group owner can be practiced also by using information retrieval protocols such as LDAP. The group messaging proxy may cache group information for use throughout the duration of message exchanges within the group.

The invention has been described with specific reference to several preferred embodiments, such as the Internet messaging. It will be apparent to one having skill in the relevant art that the invention can be modified to other messaging systems, other messaging agent implementations, etc. without departing from the scope and spirit of the invention as set forth in the appended claims.

What is claimed is:

1. A distributed message exchange system for exchange of messages among a plurality of distributed message locations, comprising:

an automatic group messaging agent located at a first message location of a group owner, said group messaging agent comprising:

at least one group storage location in local storage comprising a dynamic address store server for determining members of a group dynamically out of a set of messaging addresses according to attributes and relationships to the group owner and to one another and a static address store for storing group identification information including group identity and identities of members of said group and additionally storing access control information of messaging accounts in association with group information, wherein said group is maintained in the context of a messaging account at said first message location, a group membership resolution module to retrieve group information from said at least one group storage location for messaging, and a group message distribution module to convert a single group message addressed to a group having naming scope and management domain in the context of the group message agent into a plurality of individual messages having group message routing information comprising naming scope, semantic context and management domain information for the group messaging agent, an individual message being provided for each group member, and for sending said plurality of individual messages to group members, wherein the identities of the group members are kept undisclosed to one another and said group message routing information is attached for successive group message exchanges;

control means for verifying access control rights based on said access control information; and a plurality of messaging agents, one at each of successive ones of said plurality of message locations, to exchange electronic group messages anonymously with said plurality of message locations by transmitting group messages to said group messaging agent identified by said group message routing information, where said group message is distributed to said plurality of message locations.

2. The distributed message exchange system of claim 1 wherein said group message information comprising group routing information, group identity and the group messaging agent location, is transmitted as one of a separate user defined field, a tag, and a virtual recipient in the message header in order to facilitate successive message exchanges in a group message thread, and wherein a message transfer agent does not deliver said message by using said group message routing information as one of message destinations.

3. The distributed group message exchange system of claim 1, wherein each of said plurality of messaging agents is additionally adapted to generate a group discovery request to determine a group information such as group identity and group message routing information for a group of said plurality of message locations to initiate a group message.

4. The distributed group message exchange system of claim 3 wherein said group messaging agent is additionally adapted to receive a group discovery request, to search said at least one group storage location to retrieve said group information, and to transmit a response to said group discovery request to a requesting messaging agent, said response including said group information.

5. The distributed group message exchange system of claim 4 wherein each of said plurality of messaging agents additionally comprises at least one agent storage location for storing said group information.

6. The distributed message exchange system of claim 1 wherein said plurality of messaging agents transmit said group message as a reply to the previous group message by using said group message information contained in the message header of said previous group message.

7. The distributed message exchange system of claim 1 additionally comprising a group messaging proxy agent, said group messaging proxy agent collecting group information of one or more group messaging locations and relaying group messages on behalf of group messaging agents of said group message locations by using said collected group information.

8. The distributed message exchange system of claim 1 wherein said at least one group storage location comprises both a static permanent unchangeable storage location and a temporary ephemeral storage location.

9. A communication system comprising:
a plurality of distributed nodes comprising a group node and a plurality of successive nodes, each of said nodes comprising at least one communications module for sending and receiving electronic messages;
a group messaging agent located at said group node, said group messaging agent comprising:
at least one local group storage location comprising a dynamic address store server for determining members of a group dynamically out of a set of messaging addresses according to attributes and relationships to the group owner and to one another and a static address store for storing group identification information including the group identity and identities of member of said group and additionally storing access control information of messaging accounts in association with group information, wherein said group is maintained in the context of a messaging account at said group node,
a group membership resolution module to retrieve group information from said at least one group storage location for messaging, and
a group message distribution module to convert a single group message addressed to a group into a plurality of individual messages each having group message routing information comprising naming scope, semantic context and management domain information for the group messaging agent and to deliver one individual message to each group member, wherein the identities of the group members are kept undisclosed to one another and the group message routing information is attached for successive group message exchanges; and
control means for verifying access control rights based on said access control information; and
a plurality of messaging agents, one at each of said successive nodes, to exchange electronic group messages anonymously with a plurality of locations at a plurality of message nodes by transmitting group messages to said group messaging agent identified by said group message routing information, where said group message is distributed to said plurality of locations at said plurality of message nodes.

* * * * *